May 15, 1923.

W. OCHS 1,455,447

HAND OR PEDAL LEVER WITH AUTOMATICALLY VARIABLE RATIO OF TRANSMISSION

Filed May 17, 1922

Patented May 15, 1923.

1,455,447

UNITED STATES PATENT OFFICE.

WERNER OCHS, OF BAD LIEBENSTEIN, GERMANY.

HAND OR PEDAL LEVER WITH AUTOMATICALLY VARIABLE RATIO OF TRANSMISSION.

Application filed May 17, 1922. Serial No. 561,766.

*To all whom it may concern:*

Be it known that I, WERNER OCHS, a citizen of the German Republic, residing at Bad Liebenstein, Germany, have invented certain new and useful Improvements in a Hand or Pedal Lever with Automatically Variable Ratio of Transmission, of which the following is a specification.

Numerous machines and devices which are operated by human force with the aid of a hand- or pedal-lever, utilize the power only in a very uneconomical manner as the ratio of transmission of the lever is adapted only to the power movement of the machine and consequently necessitates great lever oscillations if the power action is preceded by an idle stroke. If great lever oscillations are not admissible, as for instance with pedal levers, the ratio of transmission has to be reduced which would however either require a greater amount of power or a reduction of the efficiency of the machine.

These uneconomical conditions exist for instance with presses, shears, punches, riveting machines, machines for inserting eyelets or hooks in boots, machines for closing tins, nailing machines, stamping machines and many other machines in which the tool has to travel first over a lost distance to come in contact with the tool followed by the real working stroke of the tool which forms a greater or shorter part of the total power stroke.

This invention has for its object to create an automatically working device which, connected with any machine tool, accounts for the individual idle part of the power stroke of this machine and consequently ensures a better and more economical utilization of the machine. It consists in an automatic enlargement of the ratio of lever transmission after the period of idle stroke or before the beginning of the working stroke proper.

An embodiment of the invention as a pedal lever is shown by way of example on the accompanying drawing.

Figure 1:
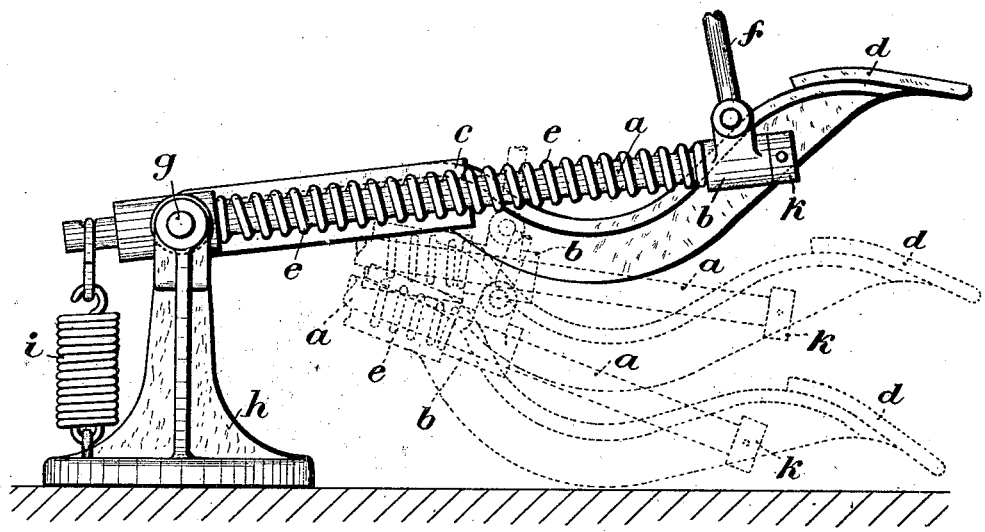
Fig. 1 is a side elevation.
Figure 2:
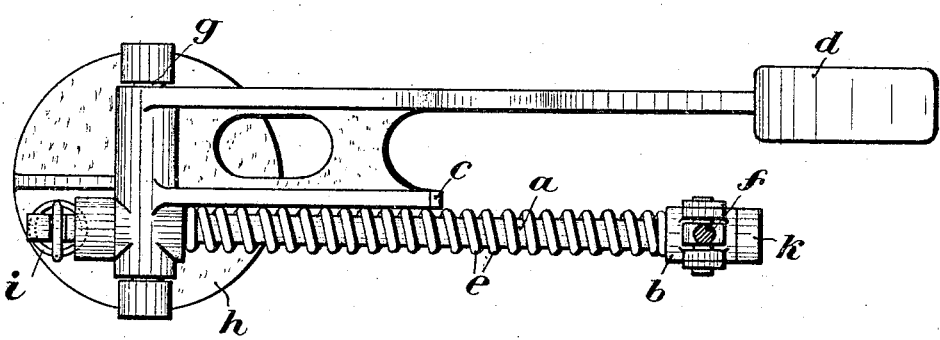
Fig. 2 is a plan view.

$a$ is a lever which is rigidly connected with the rod of the pedal plate $d$. Upon the lever $a$ a sleeve $b$ is mounted so that it can be easily displaced between the stop $c$ and the adjusting ring $k$. The sleeve $b$ is constantly pushed to the right against the adjusting ring $k$ by the pressure of the feeble spring $e$ and it is hingedly connected with the connecting rod $f$ which is attached to the machine tool. The lever $a$ oscillates around its pivot pin $g$ in the support $h$ and at rest it is slightly inclined upward. If the lever $a$ is lowered by a pressure exerted upon the pedal $d$ the rod $f$, being in close proximity to the adjusting ring $k$, operates the machine tool with a low ratio of transmission through the period of the idle stroke until tool and work piece come in contact. The lever $a$ is brought into a position inclined below the horizontal and as soon as rod $f$ has to overcome increased resistance at the working stroke which begins now, the component of the power transmitted by $f$ falling in the direction of the lever $a$, becomes great enough to overcome the pressure of spring $e$ and to shift the sleeve $b$ to the left against the stop $c$. The ratio of lever transmission is thus increased so that the working stroke is made easier or—if the same amount of power is spent—has a greater power effect. At the return of the lever $a$ to the initial position under the action of the pull spring $i$ the sleeve is moved to the right as $f$ has no longer to transmit any power and the device is ready to work again.

I claim:—

1. A hand- or pedal-lever for the operation of machine tools, in which the tool or the work piece has to make an idle stroke before the working stroke proper, comprising in combination a pivotal lever, means for depressing said lever, a sleeve movable upon said lever, a connecting rod between said sleeve and the machine tool, a spring upon said lever acting upon said sleeve in the sense of lengthening the lever arm, said lever adopting, after the idle stroke, such a position that the component of the transmitted power directed towards the fulcrum of the lever shifts the sleeve in the sense of the shortening of the lever arm so that the working stroke proper is executed in this position.

2. A hand- or pedal-lever for the operation of machine tools, in which the tool or the work piece has to make an idle stroke before the working stroke proper comprising in combination a pivotable lever, a pedal plate upon the free end of said lever, a sleeve movable upon said lever, a connecting rod between said sleeve and the machine tool, a spring upon said lever acting upon said sleeve in the sense of lengthening the lever arm, said lever adopting, after the idle stroke, such a position that the component of the transmitted power directed towards the fulcrum of the lever shifts the sleeve in the sense of the shortening of the lever arm so that the working stroke proper is executed in this position, a separate lever arm being provided for said pedal plate and for said movable sleeve so that idle strokes of greater length can be easily executed.

3. A hand- or pedal-lever for the operation of machine tools, in which the tool or the work piece has to make an idle stroke before the working stroke proper, comprising in combination a pivotable lever, means for depressing said lever, a sleeve movable upon said lever, a connecting rod between said sleeve and the machine tool, an adjustable stop for said sleeve, a spring upon said lever acting upon said sleeve in the sense of lengthening the lever arm, said lever adopting, after the idle stroke, such a position that the component of the transmitted power directed towards the fulcrum of the lever shifts the sleeve in the sense of the shortening of the lever arm so that the working stroke proper is executed in this position.

4. A hand- or pedal-lever for the operation of machine tools, in which the tool or the work piece has to make an idle stroke before the working stroke proper, comprising in combination a pivotable lever, means for depressing said lever, a sleeve movable upon said lever, a connecting rod between said sleeve and the machine tool, an adjustable stop for said sleeve, means for arresting the sleeve in its extreme position for temporarily little power effects, a spring upon said lever acting upon said sleeve in the sense of lengthening the lever arm, said lever adopting, after the idle stroke, such a position that the component of the transmitted power directed towards the fulcrum of the lever shifts the sleeve in the sense of the shortening of the lever arm so that the working stroke proper is executed in this position.

In testimony whereof I affix my signature in presence of two witnesses.

WERNER OCHS.

Witnesses:
 E. HOLZERMAN,
 HERMANN LAURALA.